Figure 1:
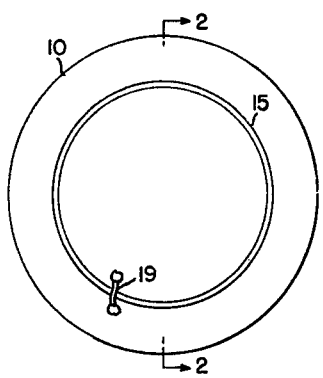

Oct. 11, 1960

H. POLLACK 2,956,184

TRANSDUCER

Filed Nov. 1, 1954

2 Sheets-Sheet 1

INVENTOR.
HYMAN POLLACK

BY Frederick E. Lange

ATTORNEY

Oct. 11, 1960 H. POLLACK 2,956,184
TRANSDUCER
Filed Nov. 1, 1954 2 Sheets-Sheet 2
FIG. 11
FIG. 9
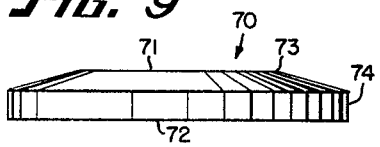
FIG. 10
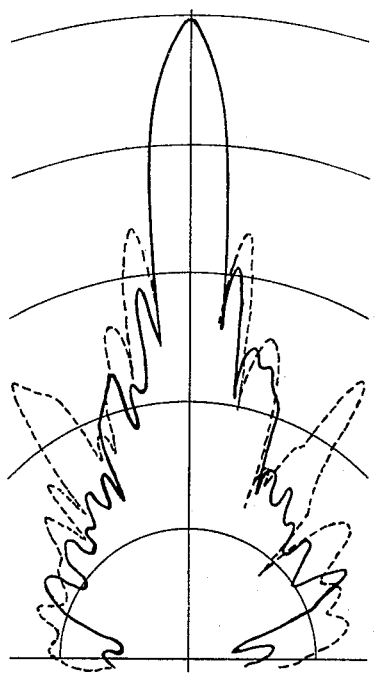
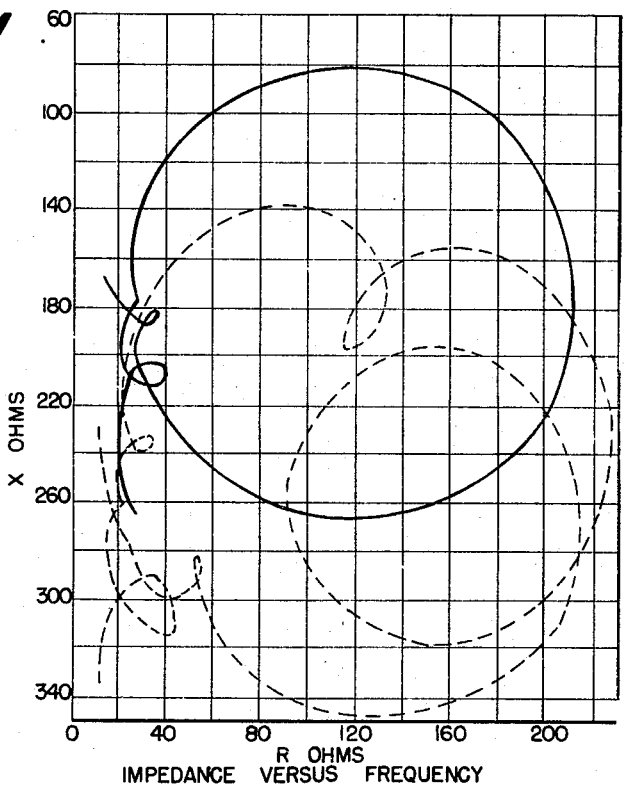
IMPEDANCE VERSUS FREQUENCY
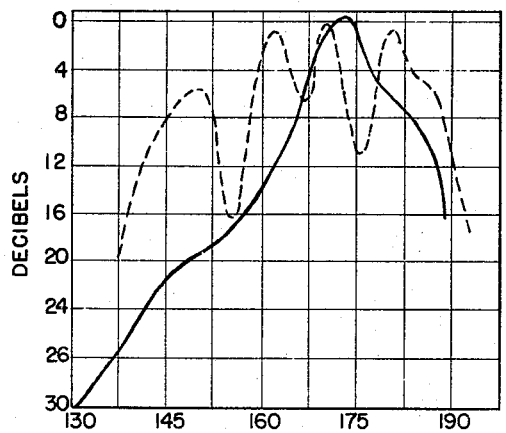
DIRECTED ACOUSTIC OUTPUT VERSUS
FREQUENCY WITH GROOVE
FIG. 12
INVENTOR.
HYMAN POLLACK
BY Frederick E. Lange
ATTORNEY

United States Patent Office 2,956,184
Patented Oct. 11, 1960

2,956,184

TRANSDUCER

Hyman Pollack, Seattle, Wash., assignor to Minneapolis-Honeywell Regulator Company, Minneapolis, Minn., a corporation of Delaware Filed Nov. 1, 1954, Ser. No. 466,011

2 Claims. (Cl. 310—8.2)

The present invention relates generally to transducers adapted to generate acoustical energy when energized with electrical energy and vice versa, and more specifically to improved electromechanical crystals which are particularly adapted for use in signaling or signal detection in a fluid medium, either compressible or non-compressible, such as an underwater signaling or detection device wherein it is necessary to generate or detect acoustical energy which propagates with high intensity only within a relatively narrow beam or main signal lobe. Devices of this sort are useful in systems for underwater depth sounding, or in determining the location of underwater objects such as fish, channels, submerged logs, or the like. In these devices a high frequency beam, a beam of given carrier frequency and which is in the form of a series of individual pulses is sent out or generated by an electromechanical transducer coupled to a fluid medium, in this case sea water, reflected by the underwater object, and the reflected pulses are then sensed by a suitable pickup device which may for convenience be the same crystal as is utilized for the generation of the original pulses. One system, for example, to which this device is adapted for use is that disclosed in Patent No. 2,599,586, June 10, 1952, to Wayne M. Ross, entitled, Marine Depth Finder, and assigned to the same assignee as the present invention.

A high frequency electrical energy source or oscillator, as is conventional in the art is utilized for driving these devices. Any given oscillator which meets the frequency and power requirements of the crystal will be satisfactory.

In connection with the transducer, piezoelectric materials such as polarized or activated barium titanate, quartz, Rochelle salt or the like are suitable. In the generation of acoustical radiations of this sort, it is generally desirable to obtain a beam pattern which is substantially directive, or, in other words, one which is held within a relatively small included solid angle or cone. Basically, one obtains such a beam by increasing the diameter of the crystal from a point source since the directivity of a beam increases with the diameter of the generating body. The desired mode of vibrational expansion and contraction contributing to this pattern is the transverse compressional mode, providing "piston-like" vibration of the planar radiating face of the transducer. In addition to improved directivity, the included solid angle or cone angle likewise decreases as the diameter of the crystol or generating body, measured in wavelengths of the vibrations, increases. Unfortunately, as one increases the diameter of a given generator or transducer, one enhances the possibility of spurious vibrations being set up within the transducer proper. The spurious modes of vibration are responsible for side lobe patterns of varying angles outward from the normal or main beam axis responsible for fluctuations in the acoustic and impedance response curves, and for a decrease in the overall efficiency of the transducer. Even though the side lobes are of somewhat lesser intensity than the main beam pattern, they nevertheless interfere with the distinctness of the beam which is reflected from the object or objects within the main beam, due to the presence of reflecting objects impinged by energy in the side lobes. As the diameter of a given transducer is increased beyond its thickness dimension, spurious longitudinal and incidental transverse modes of vibration are set up in the body of the transducer. Generally, the spurious modes of vibration include a longitudinal compressional mode, i.e. a mode of vibration generally parallel to the radiation surface, and a transverse radial shear mode incident thereto. These spurious modes, of course, are incident to the desired transverse mode which contributes to piston-like vibration of the transducer face. It is believed that a combination of the desired transverse mode with that of the spurious longitudinal and transverse modes is responsible for the generation of the undesirable side lobes in the total radiation pattern. It has been observed that if the transducer is provided with means for decoupling the spurious modes of vibration, the radiation pattern obtained from the crystal will be substantially improved, since the intensity of the various side lobes ordinarily generated are substantially suppressed.

For any given application, a crystal will be selected having a size sufficient for generation of the desired directional beam. In this connection, the crystal preferably has a substantially plain radiating face and further, a configuration such that the main beam is generated substantially normal to the radiating face. In addition to the main beam being preferably generally normal to the radiating face, this beam also preferably lies in an axis of symmetry given the crystal generator or transducer. The most desirable of these possible configurations is found in a configuration which approaches that of the plan disk having a pair of parallelly disposed radiating faces and a center or central point which corresponds with the axis of symmetry for the crystal and main beam pattern. Assuming that the desired directivity of beam pattern dictates that the crystal have a side-to-side dimension which substantially exceeds the thickness dimension, the pattern obtainable from such a crystal will generally include various undesirable side lobes in its radiation pattern. The spurious modes of vibration which are considered responsible for these side lobes include the longitudinal mode which has components in both the radial and transverse direction. For example, if a circular disk is selected having a radius which is equal to about five times the thickness dimension, there will be a single half-wave length in the crystal in the thickness or transverse mode, and they will be five half-wave lengths or nodes along the crystal in the radial longitudinal mode. The number of shear wave modes due to the combination of the desired transverse mode and the spurious radial transverse and longitudinal modes will be a number equal to twice the number of radial longitudinal nodes or, in this case, ten. The pressure nodes resulting from this combination are believed responsible for the generation of the undesirable side lobes, and in this particular case will be equal to a number which lies midway between the number of nodes in the radial longitudinal mode and the number of shear wave nodes, in this particular case this number is equal to seven or eight. It has further been observed that the side lobes resulting from the pressure shear wave nodes close to the axis of symmetry are generally small since they tend to be out of phase with the principal transverse mode of vibration, and therefore tend to cancel. Other of these nodes which are located radially outwardly from the axis of symmetry cause side lobes to be generated which are out of proportion to their amplitudes of vibration due to a phase reinforcement from the principal and other spurious modes of vibration. It is this combination of the various modes of vibration which is believed responsible for the strong side lobe appearing generally at about thirty degrees outwardly from the main or normal beam. It has been observed that a decoupling of the radial longitudinal modes of vibration at points of relatively strong contribution to this strong side lobe is extremely effective in reducing the intensity of the thirty degree side lobe to a tolerable level. This decoupling may be accomplished by provision of a transition zone which is removed from the axis of symmetry, and which provides a somewhat different radiation pattern in the crystal at the transition zone as distinguished from that pattern generated near the axis of symmetry. In addition, decoupling of spurious modes of vibration allows a greater amount of energy to be retained in the normal mode of vibration of the crystal and therefore improves the working efficiency of the transducer.

Therefore, it is an object of the present invention to provide an improved transducer having a radiation pattern with suppressed side lobes.

It is another object of the present invention to provide improved electromechanical transducers having a radiation pattern which is directive and which approaches that of a single focused beam.

It is still another object of the present invention to provide an electromechanical transducer having a transition zone provided along the path to be traversed by the spurious radial modes of vibration wherein these spurious modes of vibration are decoupled.

It is yet another object of the present invention to provide an electromechanical transducer having a plain radiating surface with an axis of symmetry, and provided with a transition zone wherein spurious modes of vibration are substantially decoupled.

It is another object of the present invention to improve the impedance characteristic of a transducer, particularly in the region of its natural resonant frequency.

It is still another object of the present invention to improve the directed acoustic response characteristics of a transducer particularly in the region of its resonant frequency.

It is still a further object of the present invention to improve the electro-acoustical efficiency of a transducer.

Figure 2:
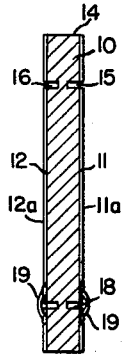
Figure 7:
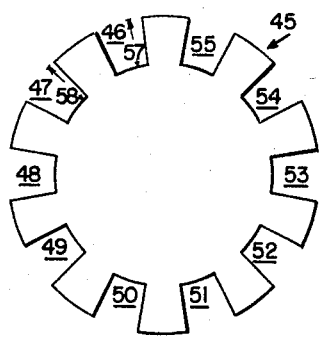
Figure 3:
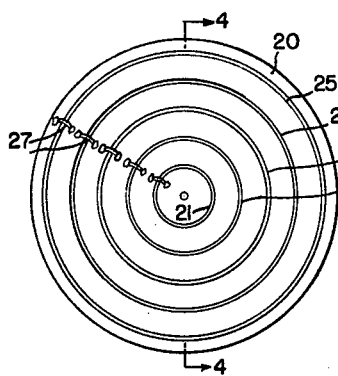
Figure 4:
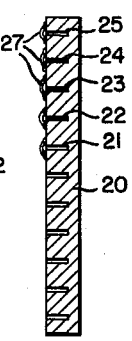
Figure 8:
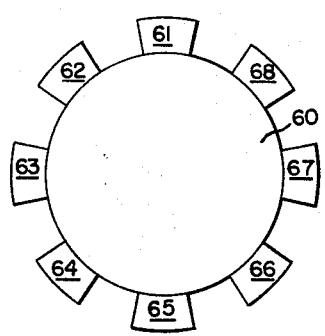
Figure 5:
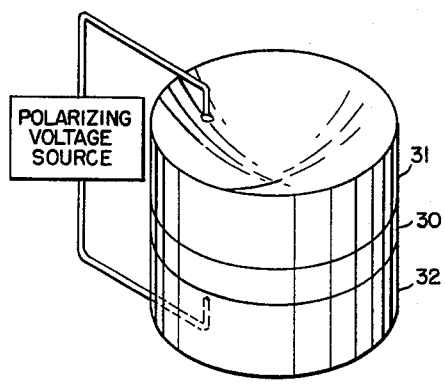
Figure 6:
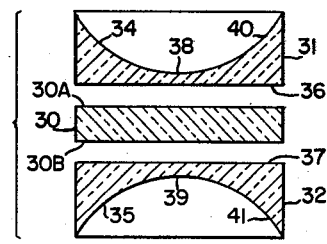

Other objects will become more apparent to those skilled in the art by reference to the following specification, claims and drawings in which:

Figure 1 is a top plan view of an improved disk-type transducer having an annular groove cut in the plain radiating face thereof; and Figure 2 is a vertical sectional view taken along the lines and in the direction of the arrows 2—2 of Figure 1; and Figure 3 is a top plan view of a modification of the device shown in Figure 1 wherein a plurality of concentric grooves are provided on the radiating surface thereof; and Figure 4 is a vertical sectional view of the device shown in Figure 3, taken along the lines and in the direction of the arrows 4—4 of Figure 3; and Figure 5 is a perspective view of a modified form of the present invention wherein apparatus is provided for differentially polarizing the transducer body; and Figure 6 is a vertical sectional view of the device shown in Figure 5; and Figure 7 is a top plan view of an additional modification of the present invention wherein radial notches are cut in the periphery of the crystal transducer; and Figure 8 is a top plan view of another modification of the present invention wherein a plurality of edge dampers are provided around the circumference of the disk; and Figure 9 is a side view of a disk-type tranducer having a beveled portion adjacent the periphery thereof; and Figure 10 is a graph which illustrates the effectiveness of the present invention in reducing the side lobe pattern of a transducer; and Figure 11 is a graph which illustrates the response curve of a crystal which has been treated in accordance with the present invention; and Figure 12 is another graph which illustrates the directed acoustic response for a given crystal as a function of frequency.

In accordance with the preferred modification of the present invention there is provided an activated barium titanate transducer, in the form of a disc generally designated 10 and benig provided with a pair of plane major faces 11 and 12 and an edge surface 14. On the major faces 11 and 12, there are provided conductive electrodes 11A and 12A in addition, annular grooves 15 and 16, which are oppositely disposed, and preferably equal in depth are cut therein. Between the annular grooves 15 and 16, there is provided a web of barium titanate material 18. A jumper wire, such as the jumper wire 19 or silver plating or other electrical connection electrically connects the portions on either side of the annular grooves. If desired, the various portions may be electrically connected by conductive paint in the grooves. Thus, it is possible to energize substantially all portions of the generator or transducer 10.

Since a groove, randomly placed, may not function to suppress the side lobes, it is of importance that the proper placing of the groove be determined before the grooving operation is commenced. In the calculations which follow the proper spacing of the grooves in any given transducer will be shown.

*Example 1*

A barium titanate disk-shaped transducer of the type illustrated in Figures 1 and 2 was obtained having a thickness of 0.36 inch and a diameter of 3.25 inches. The resonant frequency of vibration for a transducer or generator of this type when electrically energized is 265 kc./second. In this crystal, therefore, there is provided a disk or plate having a radius which is roughly five times its thickness. Such a crystal will then have five circular nodes in radial compressional vibration along the radius thereof when the crystal is driven electrically. This result is arrived at since the thickness is a half-wave length and divides into the radius about five times. It is believed that the vibration which produces the significant side lobes is not a pure compressional vibrational wave, but rather is a vibration with compressional and shear waves combined. The resulting vibration forms a standing wave with a number of nodes intermediate between the number of radial purely compressional nodes and a number which is roughly twice as large, the number of shear wave nodes in this vibrating plate being roughly twice as large as the number of compressional nodes of the same frequency. Therefore in order to calculate the "intermediate number" which is a measure of the number of nodes on the plate face due to the compressional part of the vibration of interest, Equation 1 is derived; as follows, (1) $$\frac{3}{2} \times \frac{A}{T}$$

wherein $A$ = radius of disk
$T$ = thickness of disk

In accordance with Equation 1 the number of nodes in this pattern is an integer close to the value resulting from that equation. In our present case, therefore, we obtain the following:

$$\frac{3}{2} \times \frac{1.625}{0.36} = 6.8$$

The closest integer is 7, which is the number of nodes in the compressional part of the vibration. Since these waves are believed to follow a Bessel function or series, one obtains the location of the nodes with reference to a Bessel function table. The general equations are (2) $$Y = J_0(x)$$
(3) $$kr = x$$

wherein
$x$ = argument of the Bessel function,
$y$ = deformation amplitude normal to the vibrating surface,
$r$ = radial distance, and
$k$ = a constant.

To determine $k$, assuming the edge of the disk is a node, as is the case in a free crystal, one obtains the value of "$x$" from Bessel function tables at the seventh node, which is the present case. At the seventh node out, one obtains the value of $x$ to be 21.2. Substituting in Equation 3 the value of $r$ at the edge of the disk, the value of $k$ then becomes $$k = \frac{x}{r} = \frac{21.2}{1.62} = 13.1$$

Having thus obtained the value of $k$ for this configuration, one then refers to the Bessel function table for the appropriate value of $x$ for the location of the node adjacent at which it is desired to place a groove. For example, in the present case it was preferred to groove the disk at the third node in from the edge surface, counting the edge as a node. In this case, the Bessel function gave a value of 15 (approx.) for $x$ in Equation 3, having already calculated the value of $k$ for the configuration. By simple substitution, a radius $r$ was calculated for the location of the node of interest, here slightly over 2.30. In this case, an annular groove having a center to center measurement of 2.24 inches and a width of 0.062 inch was selected thus providing an annular groove with an outer circumference of 2.30 inches. Hence, the groove lies just inside the fifth node from the center or axis of symmetry, and was extremely beneficial in suppressing the undesirable 30 degree side lobe encountered in the pattern. After the first cut has been made there may appear in a particular configuration other spurious or perturbation modes of vibration which contribute significantly to second and third side lobes in the crystal radiation pattern, that is, close to the axis of symmetry. This contribution is believed due to flexing of the crystal about the thin web of material remaining at the location of the annular ring cut previously described. The contributions to the side lobes of low number, for example second or third, may be diminished by insertion of a subsequent cut or cuts. The location of each cut may be determined by a process similar to that above described for location of the first cut, where for placement of any given cut the boundary provided by the inner edge of the next larger cut is to be regarded as the boundary of the disk mentioned in the above description of procedure for locating a cut. However, the role of a subsequent cut or cuts in reducing contributions to the side lobes of low number in the radiation pattern is believed to be different from any previously described in this specification. According to observations the role of this subsequent cut or cuts is to provide antinodes for flexing modes of vibration of the crystal, and the effect of increasing the number of antinodes is to shorten the radius of curvature of a Bessel function descriptive of the flexing vibration, this Bessel function being required to satisfy the antinodal condition at all cuts. This radius of curvature is thus made too short to allow this flexing mode to attain appreciable amplitude. Hence the role of cuts subsequent to the first in reducing amplitude of side lobes of low number where these are emphasized by introduction of the first cut, is to inhibit resonant flexing of the crystal.

It has been found most desirable to groove both sides of the circular disk, thereby providing a pair of equally and oppositely disposed grooves in the crystal. If, however, it is only desired to have grooves on one face of the crystal, it will be appreciated that the grooves are preferred on the signal generating face.

Example 2

In a similar manner to the illustration given in Example 1, the proper location of grooves can be calculated for a transducer crystal disk having somewhat different dimensions. In this case, the disk utilized is 3.25 inches in diameter and has a thickness of 0.55 inch. The resonant frequency of this crystal is found to be 175 kc./second. From Equation 1 above, we see that the number of nodes of interest are four since $$\frac{3}{2} \times \frac{1.625}{.55} = 4.4$$

Accordingly, the Bessel function table is consulted in order to obtain the value of $k$ in the Equation 3. At edge, which corresponds to the fourth "0" or node, "$x$" equals 11.7; substituting in Equation 3, one obtains a value of 7.2 for $k$. A groove placed at the third "0" from the periphery of the disc is effective in reducing the side lobes present in the radiation pattern of this disc. From the Bessel function table, it is determined, that "$x$" in Equation 3 is equal to 5.5. Substituting this value in Equation 3 one finds the radius of the node to be 0.765 inch, corresponding to a diameter of 1.53 inches. Hence the cut is made with an external or outer diameter of 1.53 inches, which corresponds to an annular cut 0.06 inch thick having a center to center measurement of 1.47 inches. It has been found that this groove is extremely effective in suppressing the 30 degree side lobe and its effectiveness is considered due to the decoupling effect between the spurious modes of vibration set up in the crystal in the radial longitudinal and radial shear modes.

Attention is now directed to Figures 3 and 4 wherein there is shown an alternative system of grooving the transducer disk in order to suppress the undesirable side lobe vibrations. In these figures, there is shown a transducer 20 having a plurality of grooves 21—25. In Figure 4, it will be noted that the grooves are generally set to a slightly different depth, that is the depth increases as the radius increases. This is considered desirable because of the increased tendency of the side lobes to be generated from portions near the periphery of the disk. Jumper wires or silver plating or other electrical connection 27—27 are provided between contiguous portions of the grooved crystal face in order that the conductive electrodes be provided with an equal potential across the major faces thereof.

Example 3

A barium titanate disk having a diameter of 3.25 inches and a thickness of 0.33 inch was selected having a pair of electrodes on the oppositely disposed major faces thereof. Grooves were placed in the disk in accordance with the dimensions set forth in Table 1 below:

| Groove | Groove O.D. | Groove depth |
|---|---|---|
| 21 | 0.590 | 0.200 |
| 22 | 1.150 | 0.230 |
| 23 | 1.658 | 0.245 |
| 24 | 2.250 | 0.230 |
| 25 | 2.850 | 0.245 |

In addition to the grooves, there may optionally be provided a center hole having a diameter of 0.050 inch and a depth of 0.180 inch.

It will be noted that the outer groove is situated approximately adjacent a node in the longitudinal mode of vibration as determined in accordance with Examples 1 and 2. In this connection, the outer annular groove is effective in decoupling the standing wave pattern across the crystal, while the inner annular grooves are relatively spaced in a manner such that at resonance, the standing wave pattern cannot be set up therebetween.

Attention is now directed to Figure 5 wherein there is shown an additional modification of the present invention wherein side lobe suppression can be achieved with an electromechanical transducer. The purpose of the present modification and its variations is to achieve differential polarization of the crystal so that the central portions of surface are more piezoelectric active than the outer portions. In Figure 5 there is shown a transducer crystal 30 having a pair of differential polarizing members 31 and 32 in intimate contact with the major surfaces thereof. The crystal 30 at this point has not been provided with electrodes on its surface, however, the differential polarizing members 31 and 32 are each provided with conductive electrodes as at 34 and 35. The differential polarizing members 31 and 32 are preferably made of the same material as is the electromechanical transducer 30, however, it will be appreciated that any material having a relatively high resistance to electrical current flow may be satisfactorily utilized. In operation, the flat surfaces 36 and 37 of the differential polarizing members 31 and 32 are placed in contact with the major faces 30A and 30B of the transducer 30. A potential is applied by means of any suitable polarizing voltage source. Thus, due to the high impedance provided in the differential polarizing members 31 and 32, the potential gradient across the narrow portion of these members, such as at 38 and 39, will be greater than at the edge portions 40 and 41. Hence the transducer 30 will be more effectively polarized at its central portions than it will at its outer portions. Therefore, in operation the central portions of the transducer will be more piezoelectrically active than will the outer portions be for a given energization potential across the crystal. Of course, electrodes will be applied to the transducer after polarization is accomplished. A consequence of this is that side lobe level will be effectively diminished. In practice, it has been found that the edge portions 40 and 41 of the differential polarizing plates should have a thickness several times that of the center portions 38 and 39.

As an alternative to the above mentioned plan, the transducer blanks could be formed as a solid cylindrical member having oppositely disposed concave or dish-shaped portions which may be removed therefrom leaving a resultant transducer having a differential polarization. In this modification, the transducer blank is polarized, and after polarization a central portion substantially intermediate between the faces is cut from the blank. After cutting of the transducer from the blank, the major faces are provided with electrodes and the device is then ready for operation.

Attention is now directed to Figure 7 wherein there is illustrated still another modification of the present invention. Here there is illustrated an electro-mechanical transducer generally designated 45 and having a plurality of radial notches 46—55 provided at the periphery thereof. It has been found that these radial type notches are effective for suppressing the undesirable side lobes encountered in signaling through a nonelastic medium. Any number greater than $A/4T$ of radial notches may be utilized, however, about $$\frac{\pi A}{T}$$

Such notches are suitable for the purpose ("A" is equal to the diameter of the crystal). With regard to the size of the notch, this will vary with different crystals, and the theory will be applied in the following example.

These notches may be either rectangular in configuration, or alternatively, they may have an inner edge configuration which is similar to a circular segment. If the notch width is about equal to the thickness T of the crystal, and the thickness of solid web between the notches is likewise about equal to the thickness of the crystal, there will be $$\frac{\pi D}{2T}$$

notches about the periphery of the crystal where D is equal to the diameter of the disk. This relationship is designed to prevent coupling between the various modes of vibration. In this manner, coupling between the spurious transverse mode and the spurious radial mode is suppressed and hence contribution to the various side lobes is diminished. This alteration of crystal configuration along the periphery of the crystal discourages the standing wave pattern in the radial mode of vibration and thereby prevents substantial coupling as stated above.

*Example 4*

A barium titanate disk having a diameter of 3.25 inches and a thickness of 0.55 inch was provided with ten notches around the outer periphery thereof. These notches were carried inwardly radially a depth in accordance with the dimension 55 in Figure 7. These notches were carried inwardly radially to a depth of one-quarter wave of the compressional part of the spurious or perturbation vibration which it is desired to suppress. The sum of the angles intercepted at the center of a circular crystal by the inner boundaries of the notches equals the sum of the angles intercepted at the center of that same crystal by the radially outermost edge of the residual parts. Because a given compression travelling outward from the center must traverse the quarter wave longer path to the outermost boundary to be reflected, then again traverse it to reenter the more central portions of the crystal where the major area of the crystal lies, this part of an originally periodic signal will be one-half wave different in phase, that is, of opposite phase, from the part of the periodic signal which will exist simultaneously at the same radius, but in a different angular location where radial compressional waves are reflected from inner boundaries of notches. Simultaneous existence of these vibrations would require radial nodes separating them, but the number of radial nodes required by the minimum specified number of notches would require a higher frequency of vibration than that of the fundamental thickness mode. It is concluded that the presence of notches as specified acts to inhibit the compressional part of spurious or perturbation vibrations, and so inhibits generation of side lobes.

In other words, the notch should be carried into the crystal radially a distance 55 which is preferably equal to an odd number of half-wave lengths. It is understood that various of the notches may be carried further into the crystal in order to set up varying decoupling schemes. For example, nodes 46, 48, 50, 52 and 54 may be carried into the disk a distance 57 which is equal to one number or half-wave lengths, while, on the other hand, grooves 47, 49, 51, 53 and 55 are carried into the disk a distance 58 which is equal to a greater number of half-wave lengths. Such a configuration is effective for decoupling the undesirable modes of vibration which contribute to the 30 degree side lobe.

Attention is now directed to Figure 8 wherein there is shown a transducer 60 having edge binding members 61—68 carried radially outwardly from the outer periphery of the disk. These binding members are preferably made of an acoustically non-absorptive material with characteristic acoustic impedance comparable to that of the crystal and are preferably of a thickness which is approximately equal to an odd number of quarter-wave lengths in the compressional mode of vibration. The theory and operation of this system is similar to that described in the above example.

Attention is now directed to Figure 9 wherein there is shown still another modification of the present invention. Here there is illustrated a disk shaped transducer or electromechanical device 70 having a pair of opposed major faces 71 and 72. The center portion of the faces 71 is parallelly disposed from the center outwardly to a point 73. Beyond this point, the thickness of the transducer 70 is diminished by means of a taper of face 71 which preferably continues out to the edge 74 of the disk 70. Therefore, without the taper introduced on the faces of the transducer, the device 70 will have a resonant frequency $f_{r1}$. However, after the tapers have been cut in the face of the transducer 70 the principal resonant frequency increases to a value $f_{r2}$. The magnitude of this increase is quite slight, and it is noted that that value relates strictly to the transducer as a whole and is due to the effect of the taper. The resonant frequency at each point along the taper is slightly different, that is, decreasing toward the center of the disk. It is well known in the art that the maximum mechanical response is obtainable at the resonant frequency point of the unit. In other words, a given crystal driven at its resonant frequency will deliver substantially more power than the same crystal driven out of resonance. Similarly, if an incremental amount of a crystal is driven at its resonant frequency, the response indicates that the portion of the crystal operating substantially at resonance will generate relatively more power than other points on the surface of the disk. It is seen therefore that a transducer disk having an outwardly tapered edge and which driven at a frequency which is substantially resonant to the central portion of the transducer, a greater portion of energy will be obtainable from that central portion which a correspondingly lesser quantity of energy is available from the edge portions of the crystal. Furthermore, it is seen that the energy generated from the regions approaching the periphery of the disk will generate a diminishing amount of energy as one approaches the periphery of the disk since the operating frequency becomes further removed from the resonant frequency of the disk as the edge is approached. The response of a crystal cut in this manner and driven at the proper frequency is superior to that of a normal disk transducer and the side lobes are thus substantially suppressed.

Attention is now directed to Figure 10 wherein there is graphically illustrated the response characteristics of a transducer without side lobe suppression means and a similar pattern superimposed for the same transducer having side lobe suppression means. The solid lines of Figure 12 indicate the pattern obtained after the transducer has been grooved in accordance with Example 1. The dotted line, on the other hand, shows the radiation pattern of the same transducer before grooving. It is apparent from the patterns that substantial improvement has been achieved by the side lobe suppression scheme and in particular the 30 degree side lobe pattern has been substantially suppressed. It is also seen that the main pattern has been slightly narrowed and the side lobes close in to the main beam, for example, the side lobe at about 7½ degrees and again at about 15 degrees have been suppressed.

The response curve and/or the impedance characteristics of a transducer prepared as in accordance with the present invention is highly improved over a transducer which has not been treated to suppress the spurious modes of vibration. Figure 11 illustrates, in solid line, the general characteristic obtained with the transducer treated in accordance with the present invention, as opposed to the same transducer in the ungrooved or unimproved condition as illustrated in the dotted lines in the same figure. In this connection, it is seen that the response of the transducer will be easily controlled for operation at maximum piezoelectric response point, that is, close to the resonant driving frequency. In other words, the drift which almost inevitably occurs due to such things as shifts in the oscillator frequency and shifts in the resonant frequency of the crystal due to variations in the temperatures and other environmental features. These will not cause the crystal to be driven at poor frequency thereby destroying the amplitude response of the transducer.

Other advantages of the improved response characteristic are well known in the art, such as matching impedance of the crystal and the like. Of course the other methods of decoupling as disclosed herein are effective in improving this pattern. Figure 12 illustrates the characteristic directed acoustic response of a given crystal as a function of frequency for a grooved transducer and for an ungrooved transducer; the solid pattern shown for a grooved transducer and the dotted line shown for a transducer without this improved feature.

Although various other embodiments of this invention will become apparent to those skilled in the art, the scope of this invention is intended to be limited only to the extent of the appended claims.

I claim as my invention:

1. A transducer comprising a body of unitary, circular, piezoelectrically active material having a radial dimension substantially in excess of the thickness dimension and having a natural resonant mechanical frequency and wavelength when an electric potential is applied thereto, the energy of vibration being distributed between a desired transverse mode and an undesired longitudinal mode, the radial dimension of said body being sufficiently great that there is at least one intermediate node in the undesired longitudinal mode of vibration, and an annular groove in the face of said body and located along an intermediate node of said longitudinal mode of vibration to suppress said longitudinal mode of vibration.

2. A transducer comprising a body of unitary, circular, piezoelectrically active material having a radial dimension substantially in excess of the thickness dimension and having a natural resonant mechanical frequency and wavelength when an electric potential is applied thereto, the energy of vibration being distributed between a desired transverse mode and an undesired longitudinal mode, the radial dimension of said body being sufficiently great that there are at least two intermediate nodes in the undesired longitudinal mode of vibration, and a plurality of concentric grooves in the face of said body, each groove being located along one of said intermediate nodes of said longitudinal mode of vibration to suppress said longitudinal mode of vibration, said grooves being progressively deeper the greater their radial spacing from the center of said body.

References Cited in the file of this patent

UNITED STATES PATENTS

| | | |
|---|---|---|
| 2,161,980 | Runge et al. | June 13, 1939 |
| 2,262,966 | Rohde | Nov. 18, 1941 |
| 2,485,722 | Erwin | Oct. 25, 1949 |
| 2,498,737 | Holden | Feb. 28, 1950 |
| 2,543,500 | Kettering | Feb. 27, 1951 |
| 2,595,037 | Wolfskill | Apr. 29, 1952 |
| 2,655,070 | Slaymaker et al. | Oct. 13, 1953 |
| 2,716,708 | Bradfield | Aug. 30, 1955 |
| 2,748,369 | Smyth | May 29, 1956 |
| 2,875,355 | Petermann | Feb. 24, 1959 |